United States Patent [19]

Matsuda et al.

[11] Patent Number: 4,557,890
[45] Date of Patent: Dec. 10, 1985

[54] SPRAY DEVICES FOR NUCLEAR REACTOR CORES

[75] Inventors: Waka Matsuda, Yokohama; Tatsuo Kagawa, Tokyo, both of Japan

[73] Assignee: Tokyo Shibaura Denki Kabushiki Kaisha, Kanagawa, Japan

[21] Appl. No.: 445,762

[22] Filed: Nov. 30, 1982

[30] Foreign Application Priority Data

Dec. 10, 1981 [JP] Japan .................................. 56-199156

[51] Int. Cl.⁴ ............................................. G21C 15/18
[52] U.S. Cl. .................................... 376/282; 376/352; 239/587
[58] Field of Search ........................ 376/282, 283, 352; 239/587, 565, 566, 557; 261/117, 115; 55/230

[56] References Cited

U.S. PATENT DOCUMENTS

| 1,354,838 | 10/1920 | Perkins | 239/587 X |
| 1,914,850 | 6/1933 | Foster | 239/587 X |
| 1,971,262 | 8/1934 | Hendricks | 239/587 X |
| 2,129,471 | 9/1938 | Juengst | 239/587 X |
| 3,300,388 | 1/1967 | Jerman et al. | 376/282 X |
| 3,413,810 | 12/1968 | Kaufmann | 239/566 |
| 3,503,554 | 3/1970 | Clifton | 239/587 X |
| 3,558,064 | 1/1971 | Dederra et al. | 239/566 X |
| 4,093,513 | 6/1978 | Berens et al. | 376/282 |
| 4,119,152 | 10/1978 | Koyama | 239/565 X |
| 4,259,156 | 3/1981 | Neuenfeldt et al. | 376/352 |

FOREIGN PATENT DOCUMENTS

| 3231565 | 7/1983 | Fed. Rep. of Germany | 376/282 |
| 0148694 | 12/1978 | Japan | 376/282 |
| 0036493 | 3/1979 | Japan | 376/282 |
| 0042595 | 4/1979 | Japan | 376/282 |
| 0111097 | 8/1979 | Japan | 376/282 |

Primary Examiner—Deborah L. Kyle
Assistant Examiner—Dan Wasil
Attorney, Agent, or Firm—Stevens, Davis, Miller & Mosher

[57] ABSTRACT

A spray device adapted to spray cooling water vertically to a reactor core in the event of a coolant accident and located in a space between the reactor core surrounded by a shroud and a shroud head mounted on the shroud. The spray device comprises a duct assembly disposed along an inner periphery of the shroud, a plurality of pipes pivotably connected to the duct assembly so as to be movable between horizontal and vertical positions, and nozzles provided for the respective pipes for downwardly ejecting the cooling water to the reactor core.

5 Claims, 8 Drawing Figures

SPRAY DEVICES FOR NUCLEAR REACTOR CORES

BACKGROUND OF THE INVENTION

This invention relates to a spray device used for a reactor core of a nuclear reactor to spray cooling water to the upper portion of the reactor core for rapidly cooling it in the event of loss of coolant accident (LOCA).

In a nuclear reactor, particularly a light water type nuclear power reactor, in which a reactor core is contained in a reactor pressure vessel and surrounded by a shroud, LOCA may occur because of breaking of a water recycle duct system resulting in flow out of water from the reactor core. At this time, water level lowers to such an extent as fuel assemblies are exposed and the reactor core runs in a condition of less or no coolant (hereafter called coolant-less operation), whereby the fuel assemblies are overheated and damaged.

In order to prevent the coolant-less operation of the reactor core, a spray device is usually arranged above the upper portion of the reactor core to supply the cooling water. In a spray device of the usual horizontal type, it is arranged along the peripheral wall of the shroud and between the upper portion of the reactor core and a shroud head detachably mounted on the upper portion of the shroud to close it.

In the spray device of this horizontal type, cooling water is sprayed horizontally towards the central axial portion of the reactor core through nozzles attached to a circular duct, i.e. sparger, located along the periphery of the shroud.

However, the spray device of the horizontal type involves serious and difficult problems for uniformly spraying cooling water to reach the central axial portion of the reactor core in the event of LOCA. Namely, steam blown up from the reactor core is condensed by cooling water horizontally sprayed and the cooling water therefore hardly reaches the central axis portion of the reactor core so that the cooling water cannot be uniformly distributed throughout the entire portion of the reactor core. Moreover, temperature distributions in the reactor core differ along the radial direction at the peripheral portion and the central portion, so that there is a problem that sufficient quantity of the cooling water cannot be supplied to the central portion of the reactor core which requires most efficient cooling for the reason that the fuel assemblies located near the periphery of the reactor core is run at a relatively low power and those near the central portion thereof is run at a relatively high power. Therefore, the sprayed water easily falls down at the periphery of the reactor core, and in addition, the blown-up steam is largely condensed by the sprayed cooling water near the periphery of the reactor core and hardly condensed at the central portion thereof because subcooled temperature is high near the periphery and nearly zero at the central portion. Consequently, the cooling efficiency at the central portion is extremely lowered.

In order to obviate defects described above, it has been proposed to construct and use a spray device so as to eject a large amount of cooling water under pressure so that sufficient amount of cooling water can reach the central portion of the reactor core, but the spray device of this type involves problems regarding arrangement and distribution of spray nozzles as well as design and size of the spray device necessary to supply the cooling water effectively and uniformly.

In order to obviate problems encountered by the conventional spray device of the horizontal type described above, spray devices of vertical type was proposed in which cooling water is sprayed from a portion above the reactor core by taking into consideration the temperature distribution and sprayed amount of the cooling water along the radial direction of the reactor core.

One conventional spray device of the vertical type is attached to the shroud head so as to spray cooling water downwardly onto the reactor core and this spray device is connected to a duct attached to and extending through the wall of the reactor pressure vessel for supplying cooling water to the spray device. However, with the spray device of this type, it is necessary to change the construction of the shroud head, and moreover, at the time of mounting or dismounting the shroud head, it is troublesome to connect or disconnect the spray device to or from the duct for supplying cooling water to the spray device.

The same problems as described above are encountered in another spray device of the vertical type in which the spray device provided with nozzles is stretched on the inner side of the shroud head to downwardly spray cooling water. In addition, the weight of the shroud head increases.

SUMMARY OF THE INVENTION

It is an object of this invention to obviate defects of the prior art spray devices and to provide an improved compact spray device of vertical type capable of uniformly spraying cooling water to the reactor core.

Another object of this invention is to provide an improved spray device having spray nozzle means located above the reactor core and can be easily moved to a position not disturbing the exchanging operation of fuel rods.

According to this invention, there is provided a spray device for spraying cooling water to a reactor core contained in a reactor vessel in an event of loss of coolant accident, the spray device being located in a space between the reactor core surrounded by a shroud and a shroud head mounted on the shroud and the spray device is characterized in that there are provided a duct assembly disposed along the inner periphery of the shroud, a plurality of spargers pivotably connected to the duct assembly so as to be movable between horizontal and vertical positions, and a plurality of nozzles provided for the respective spargers for downwardly ejecting the cooling water to the reactor core.

The nature, utility, and further features of this invention will become more clearly understood from the following detailed description when read in conjunction with the accompanying drawings, in which like parts are designated by the same reference numerals.

BRIEF DESCRIPTION OF THE DRAWINGS

In the accompanying drawings

DESCRIPTION OF THE PREFERRED EMBODIMENTS

Figure 1:
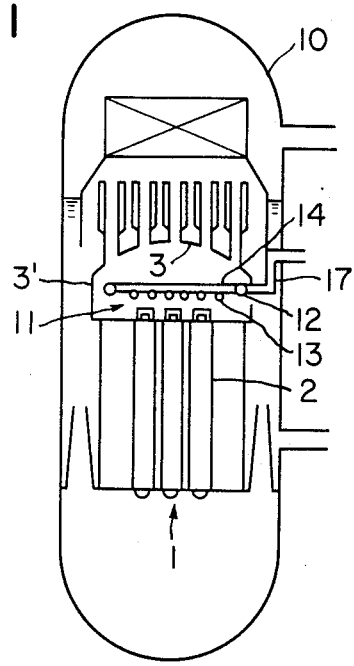
FIG. 1 is a longitudinal sectional view showing a reactor pressure vessel including a spray device according to this invention.

In a nuclear reactor shown in FIG. 1, a reactor core 1 is contained in a reactor pressure vessel 10 and surrounded by a shroud 3', the upper portion of which is covered by a shroud head 3. A spray device 11 is located in a space between the shroud head 3 and the reactor core 1 and the spray device 11 is connected to a duct 17 attached to and extending through the walls of the shroud 3' and the pressure vessel 10 as shown in FIG. 1.

Figure 2:
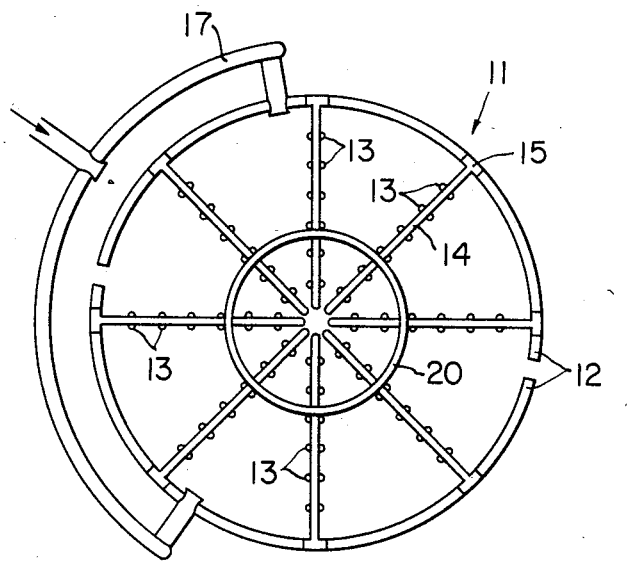
FIG. 2 is a plan view showing a spray device according to this invention.
Figure 3:
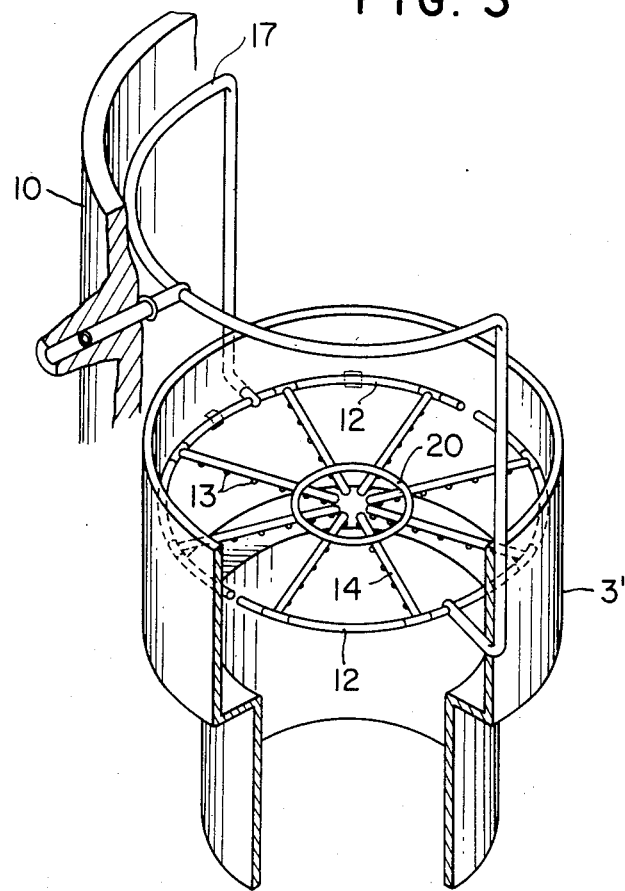
FIG. 3 is a perspective view of a spray device shown in FIG. 2 when it is attached to a shroud of a nuclear reactor.

One embodiment of the spray device 11 is shown in FIG. 2 in an enlarged scale, in which arcuate pipes 12 (two in this embodiment) are connected so as to form a header 12 having substantially circular shape and extending along the periphery of the shroud 3' above the reactor core 2. A plurality of pipes or spargers 14 are pivotably attached to, at an equal spacing, the header 12 through connecting members 15 so that the spargers 14 extend towards the central axis of the reactor core when they are rotated to the horizontal positions. A plurality of nozzles 13 are secured to each spargers 14. An arcuate duct 17 is connected to the header 12 for supplying cooling water to the spray device 11. The duct 17 supported by the shroud 3' and the wall of the reactor pressure vessel 10 is best shown in FIG. 3. Thus, according to this invention, it is not necessary to disconnect the spray device from the cooling water supply duct 17 when the shroud head 3 is dismounted.

Figure 4:
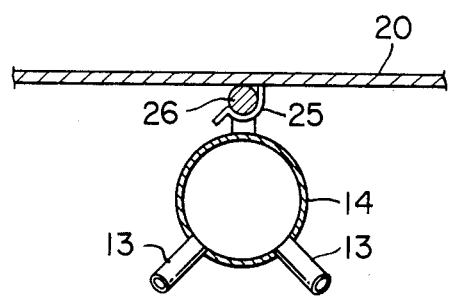
FIG. 4 shows one example of an attachment of a spray pipe to a ring according to this invention.

During the normal operation of the nuclear reactor, the spray device 11 is disposed at a position shown in FIG. 3 and the inner ends of the spargers 14 are all unitarily combined by a circular ring member 20 by known means such as bayonet connector as shown in FIG. 4, in which reference numeral 25 designates a leaf spring attached to the lower surface of the ring 20 and adapted to engage a hook member 26 secured to the upper portion of the sparger 14.

Figure 5:
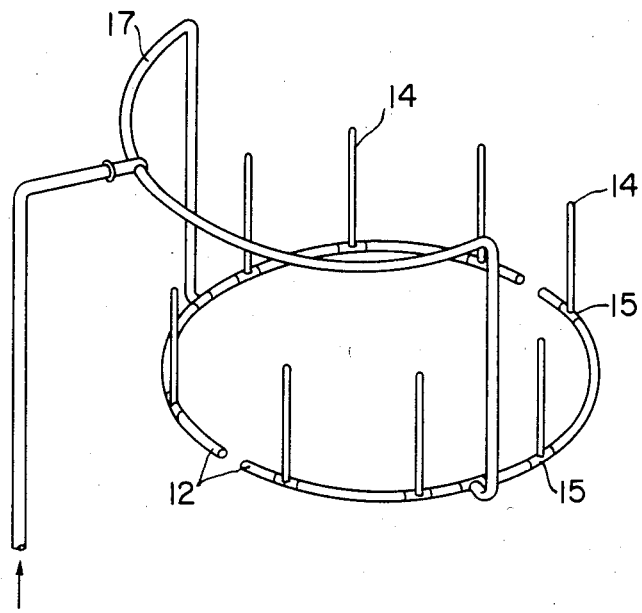
FIG. 5 shows the spray device shown in FIG. 2 in which spray pipes are their vertical positions.
Figure 6:
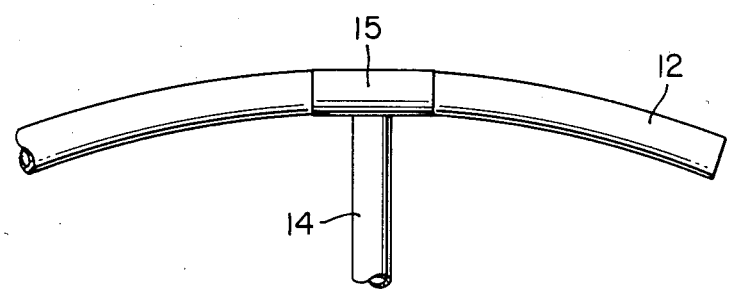
FIG. 6 shows one example of a manner of connecting the spray pipe to a sparger.
Figure 7:
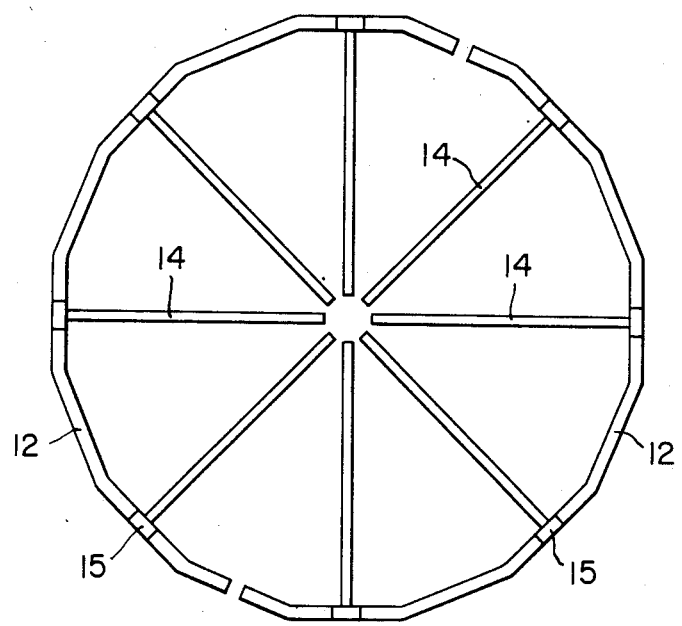
FIG. 7 is a plan view showing another example of the sparger.

When the shroud head 3 is removed at the time of exchanging fuel rods or assemblies 2, the ring 20 is first removed and the pipes 14 are upwardly rotated by about 90° around the connecting members 15 to the vertical positions as shown in FIG. 5 by hanging up the hook members with a crane. The fuel rods 2 are then freely exchanged without removing the spray device 11. The spargers 14 are constructed to maintain their vertical and horizontal positions by using suitable stop members, not shown. In order to smoothly rotate the spargers 14, it is necessary to use straight connecting members 15 as shown in FIG. 6 for connecting arcuate pipes 12. In this connection the use of a polygonal header 12 diagrammatically shown in FIG. 7 is advantageous.

Figure 8:
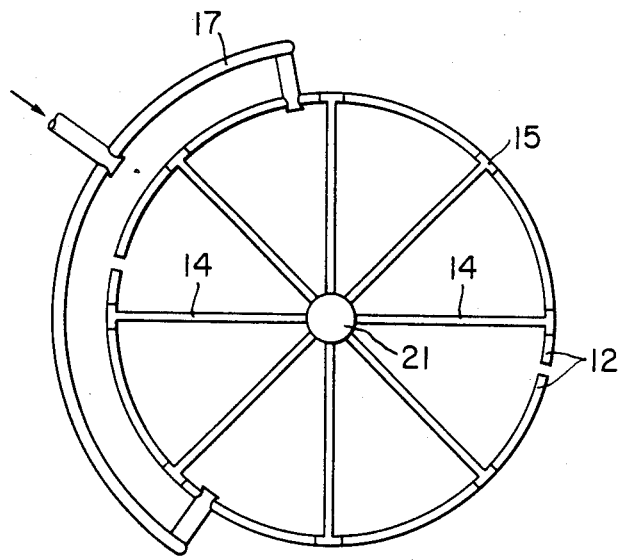
FIG. 8 is a plan view showing a modified spray device according to this invention.

The circular ring 20 may be replaced with a small disc 21 as shown in FIG. 8, in which the disc 21 can also be attached to the inner ends of the pipes 14 by known bayonet connector or bolts. In the other example, the ring 20 or disc 21 can be supported by a support member, not shown, attached to the shroud head 3.

The number and distribution of the nozzles 13 on each sparger 14 can be freely determined as desired.

According to the construction of the spray device described hereinabove, at LOCA, the spray device 11 operates in response to an emergency signal for supplying cooling water to the reactor core from the cooling water supply duct 17 through the header 12, spargers 14, and nozzles 13. The cooling water is downwardly sprayed by an amount predetermined by the arrangement or distribution of the spray nozzles 13. Although the spargers 14 are subjected to upward reaction force caused by downwardly ejected cooling water, since the inner ends of all spargers 14 are unitarily combined by the circular ring 20 or small disc 21, the spargers 14 are positively maintained at their horizontal positions without being raised upwardly.

According to this invention, since a spray device located above a reactor core is provided with a plurality of spargers extending from a shroud towards the central portion of the reactor core and each sparger is provided with nozzles arranged along the radial direction, a suitable amount of cooling water can be supplied uniformly and effectively to the reactor core in the event of LOCA. In addition, the spargers can be rotated from their horizontal positions to vertical positions, so that it is not necessary to remove the spray device at the time when a shroud head is disassembled to exchange fuel rods or assemblies.

We claim:

1. A nuclear reactor system comprising:
   a reactor pressure vessel;
   a reactor core contained in said reactor pressure vessel and surrounded by a shroud and a shroud head mounted on said shroud;
   a fuel rod assembly disposed in said reactor core so as to define a space between a top end of said fuel rod assembly and said shroud head; and
   a spray device supported to said shroud and located in said space for spraying cooling water to said fuel rod assembly; said spray device comprising duct means disposed along the inner periphery of said shroud, a plurality of spargers pivotably connected to said duct means and extending therefrom toward a central axis of said reactor core when said spargers assume a substantially horizontal position, said spargers being rotatable upwardly by more than 90° from said horizontal position, a plurality of nozzles provided for said respective spargers for downwardly ejecting cooling water to said fuel rod assembly, and means for unitarily securing said spargers when they are horizontally positioned.

2. The system according to claim 1 wherein said means comprises a circular ring secured to said spargers.

3. The system according to claim 1 wherein said means comprises a disc plate secured to inner ends of said spargers.

4. The system according to claim 1 wherein said duct means comprises a plurality of arcuate sections which are interconnected into a circular configuration by straight connecting members connected to outer ends of said pipes.

5. The system according to claim 1 wherein said duct means comprises a plurality of sections, each having a straight central portion and two short straight portions connected to the opposite ends of said central portion, and straight connecting members interconnecting said sections into a generally circular configuration, each connecting member being connected to an outer end of said sparger.

* * * * *